Patented Dec. 19, 1944

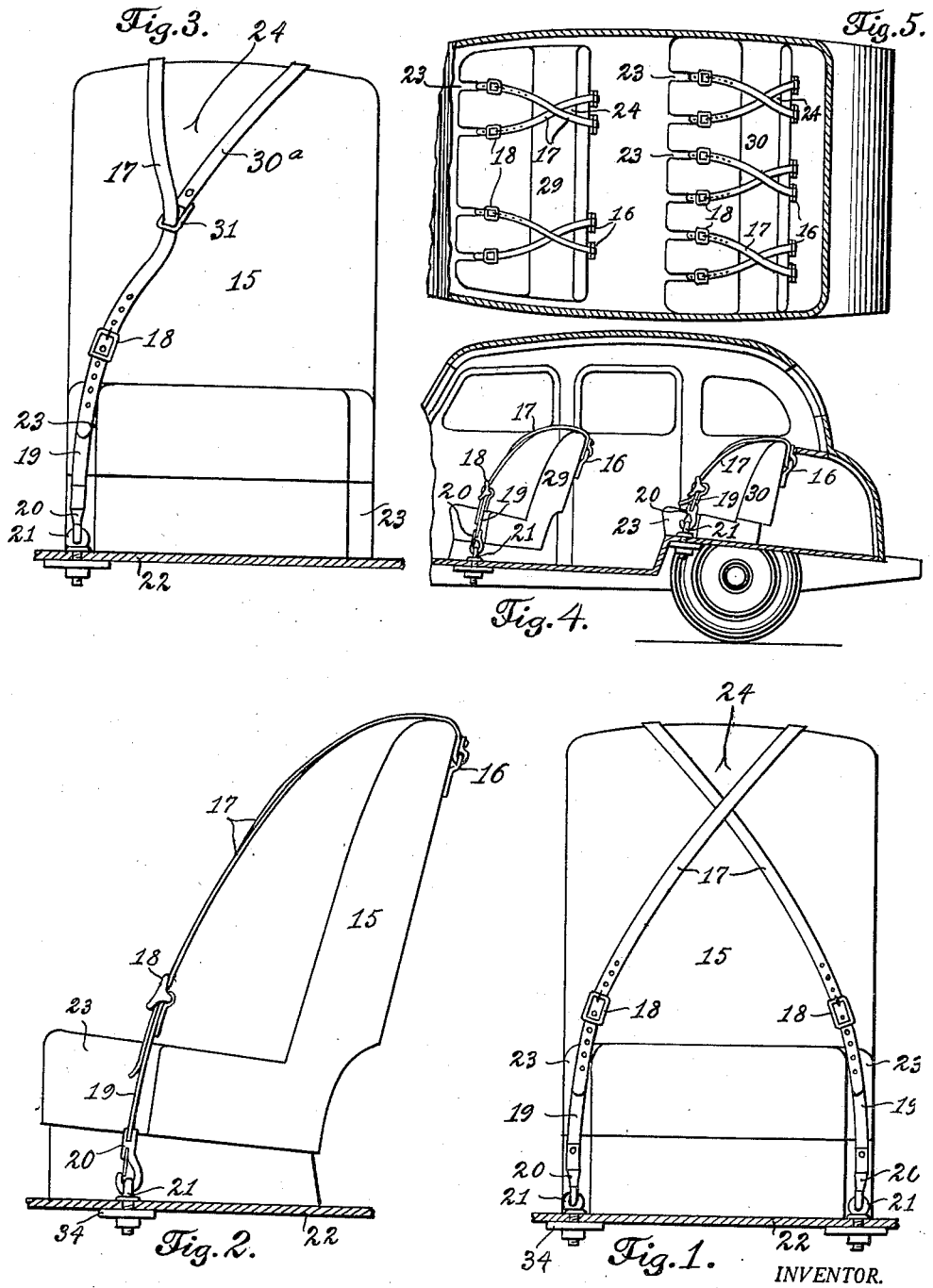

2,365,626

UNITED STATES PATENT OFFICE 2,365,626

SAFETY HOLDING DEVICE FOR VEHICLES

Vernon R. Carlisle, Kenosha, Wis.

Application December 22, 1941, Serial No. 423,940

4 Claims. (Cl. 155—189)

This invention relates to improvements in safety holding devices for passengers of vehicles, the device being particularly designed to be applied to various vehicles for holding and restraining the occupants or passengers from being thrown forward or injured in case of accident or collision and adapted to be applied to the seats of various vehicles such as passenger automobiles, buses, trains and trucks, and is a continuation in part of my prior application for Safety devices for vehicles, Serial No. 227,032, filed August 27, 1938, now Patent 2,267,373, issued Dec. 23, 1941.

Long observation and study on the part of the applicant has led him to the conclusion that a large number of fatalities and injuries could be avoided if proper safety devices were placed on the seats of vehicles and if the persons using the seats utilize the safety devices. As is well known, when a vehicle is in a collision the vehicle may be stopped but the tendency of the body of a passenger is to move forward and crash through a windshield, etc., or against some other object causing injury or fatality. It is believed that there is no more effective way to minimize injuries and fatalities resulting from accidents than by furnishing proper safety devices for said vehicles. To that end, it has been an object of my invention to provide safety devices for vehicles such as straps or other similar devices which will effectively limit the movement of an occupant of a vehicle which is stopped in collision so as to prevent or minimize injury to the occupant.

Another object has been to provide safety devices of this kind which may be easily utilized and which may be adjusted and which may be arranged out of the way when not in use.

Another object has been to provide safety devices of the kind described which are inexpensive to produce and simple to attach and install.

These and other objects and advantages will appear more fully in the hereinafter specification when taken in connection with the accompanying drawing, in which;

Fig. 1 is a front view of a seat showing one form of safety device applied thereto;

Fig. 2 is a side view of the same;

Fig. 3 is a front view of a modified form;

Fig. 4 is a side view of an automobile partly in section illustrating the application of the safety device to the seats thereof, and Fig. 5 is a plan view partly in section of the cab of an automobile with the invention of Fig. 1 applied.

Referring more particularly to the drawing and especially to Figs. 1 and 2 I have shown a conventional seat 15 of an automobile with a pair of brackets 16 at the back near the top thereof. Ordinarily these would be positioned above the robe rail. A pair of straps 17 are secured at one end of each to these brackets and these straps are provided with a plurality of holes in their free end portions. The straps 17 at their free ends are adapted to be secured by means of buckles 18 to the free ends of two straps 19. At the other ends of the straps 19 the same are provided with snap fasteners, hooks or the like 20 which are adapted to engage or snap into eyebolts, loops or the like 21 which may be mounted on the floor 22 of a vehicle or at any point in the front of the seat or to the seats themselves at the lower portions thereof. Where the device is applied to individual or single seats, or to the ends of long seats, recesses 23 may be provided in the seat preferably at the sides and front corners thereof to accommodate the straps 19.

It will also be understood that the device is adaptable for front and back seats and when in use, the straps 17 are crossed to form a head opening 24 above the point of crossing of the straps 17 so that the latter will extend across the chest or front of the body of a person reposed on the seat. It will thus be seen that when this device is in use a person takes his seat and the straps 17 which may be disconnected at the buckles 18 or at the snap fasteners 20 from the eyebolts 21, may be crossed in front of the person and then connected either at the buckles 18 or eyebolts 21. The buckles are adjusted to secure the desired adjustment for comfort and proper retention of the person seated. It will also be seen that a person may take a seat in an automobile for example and adjust the straps 17 over the shoulders and connect the same to the straps 19 at the buckles 18 so as to extend across the chest or with the straps 17 initially connected to the straps 19 at the buckles 18 and straps 19 loose at their lower ends, connection may be made at the snap fasteners 20 with the eyebolts 21. In either event, the necessary lenthwise adjustment of the straps 17 and 19 may be obtained at the buckles 18 so as to properly fit the body.

In the form of the invention disclosed in Fig. 3 of the drawing, which may also be utilized for front or back seats there are provided a strap 17 having a plurality of holes in its free end portion and adapted to engage and be secured by means of a buckle 18 at the upper free end of a strap 19 the same as heretofore described and also a strap 30a having a ring or loop 31. It will be understood that the straps 17 and 30a are secured by brackets such as the brackets 16 heretofore disclosed on the back of the seats. In this arrangement the strap 17 is passed through the ring 31 of the strap 30a and thence downwardly and at its end is buckled at 18 to the strap 19. Thus, it will be seen that a person may, after being seated, or even before being seated, insert his head in the opening 24 and may then either buckle strap 17 to the strap 19 if it has been unbuckled and obtain the proper adjustment to properly secure the body, or may use the snap fastener 20 to secure the same in the eyebolt 21.

Referring to Figs. 4 and 5 of the drawing I have disclosed front and back seats 29 and 30 the backs of which are provided with the brackets 16 having the straps 17 secured thereto and the other parts are arranged as previously described except that the straps 19 instead of extending into corner recesses 23, extend down in front recesses of the seat for connection with the eyebolts, eyelet brackets or loops located on the seat or on the floor 22 adjacent the front of the seat intermediate the ends. The straps 19 may extend downwardly between the legs of a person and the straps snapped on to the eyebolts or the like 21 by means of the snap fasteners or hooks 20. As shown, the straps 19 extend over the front of the seats and are thereby detachably anchored to the floor as previously described. Also, it will be understood that the invention is not limited to the use of the eyebolts and snap fastening means but other equivalent means may be used, nor is my invention limited to the buckles shown or to buckles at all and other equivalent means may be substituted for fastening or adjustment. Also, it will be seen that when the invention is used, a person takes his seat and the straps 17 may be drawn or engaged over the shoulders with the head projecting between the same and above the point of crossing of the straps at the body or chest and the latter adjusted as desired. Also, the straps 17 may be adjusted at their connection with the straps 19 by the buckles 18 to any length desired to suit different persons according to their sizes or desires in order to secure proper comfort. On the other hand, a person may after being seated insert his head between the straps 17 and 30a above the point of crossing and then connect the snap fastener 20 with the eyebolts or the like 21 attached to the floor at the front of the seat. On the other hand, if straps 17 and 19 are used in pairs as shown in Figs. 1, 2, 4 and 5, and straps 17 have been disconnected from the straps 19 and the snap fasteners 20 remain connected to the eyebolts 21, the straps 17 may be connected through the buckles 18 and adjusted as desired to properly fit the body without unnecessarily restraining the seated person so that different persons may be secured in position and held safely against injury in case of an accident or collision. The same is true where only one strap 17 and one strap 19 are used as shown in Fig. 3 in connection with strap 30a and loop 31. It is also to be understood that four straps are provided for the front seat and four or six straps, as seen in Fig. 5, provided for the rear seat, that is two for each person seated. Also, it is to be understood that the straps 17 and 30a may after extending over the seat back be anchored in any suitable manner such as to the body of the vehicle or a wall thereof, or to the floor as described in connection with the straps 19, but in back of the seat instead of in front thereof as shown in my prior Patent 2,267,373 and my application Serial No. 423,939 filed of even date herewith, respectively. The idea is to firmly anchor the straps so that if the seat is torn loose by the force of inertia in case of impact or collision in an accident the passenger will be held to the seat and interior of the car independently of the seat and the seat held in position as well, so that the passenger will not be thrown or bashed against an unyielding part of the vehicle or crushed.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. In a safety device of the kind described for the seat of a vehicle, a strap disposed in an inclined position to extend over the seat in front of the seat back and over the top of the latter and secured at one end in back of the seat back, detachable fastening means for securing the other end of said strap to the floor of said vehicle adjacent the front of the seat, a second strap secured at one end in back of said seat back, extending upwardly over the seat back and downwardly diagonally in front of the seat back with its lower end terminating in front of the seat back, said second strap having a ring at its lower end through which said first mentioned strap is adapted to extend to form a head opening through which a person is adapted to insert his head, said straps being adapted to extend across the chest of a person seated in said seat and to limit the movement of said body relative to said seat.

2. In a safety device of the kind described for a seat for a vehicle having a back, a pair of straps each secured in back of said seat back at one end, means confining the opposite ends of the straps, the confining means comprising eye-bolt and snap fastening means for securing at least one of said straps at its other end to the floor adjacent the front of said seat, said secured straps being adjustable in length by means thereon adjacent the top of the seat and extending down through recesses in front of the seat, said straps being arranged in convergent relation extended diagonally across each other at the front of the seat back to provide a body and head opening, and said straps being adapted to cover portions of a body seated in said seat, and to limit movement of said body relative to said seat.

3. In a safety device of the kind described for a seat of an automobile or similar vehicle, a plurality of straps extending up and down in front of the seat back for each person, each having its upper end extending over the seat back and anchored in back of the seat back, said seat having recesses at the front receiving said straps downwardly therethrough, and means for securing the straps at their other lower ends to the floor adjacent the base portion of the seat at the front thereof.

4. In a safety device of the kind described for a seat for a vehicle having a back, a pair of straps each secured in back of said seat back at one end, eye-bolt and snap fastening means for securing said straps at their other ends to the floor adjacent the front of said seat, said secured straps being adjustable in length by means thereon adjacent the top of the seat and extending down through recesses in front of the seat, said straps being arranged in convergent relation extended diagonally across each other at the front of the seat back to provide a body and head opening, and said straps being adapted to cover portions of a body seated in said seat, and to limit movement of said body relative to said seat.

VERNON R. CARLISLE.